Dec. 28, 1965  S. S. HYMAN  3,225,623

FAST IDLER ATTACHMENT FOR CARS

Filed March 9, 1964

INVENTOR
*SIDNEY S. HYMAN*

BY

ATTORNEY

United States Patent Office 3,225,623
Patented Dec. 28, 1965

3,225,623
FAST IDLER ATTACHMENT FOR CARS
Sidney S. Hyman, 10000 Old Field Drive, Bon Air, Va.
Filed Mar. 9, 1964, Ser. No. 350,444
1 Claim. (Cl. 74—532)

This invention relates to an attachment for an automobile, and more especially to a device used to warm up an automobile engine or to hold an engine at a predetermined speed while testing and repairing the automobile.

Devices have been proposed for this purpose but have been inconvenient, expensive, and bulky. The known devices have required readjustment at each use, and have, in many cases, been secured to the accelerator pedal or some other part of the automobile in a manner that made their use complicated and time consuming, and therefore of little practical value.

It is, therefore, an object of the present invention to provide a device that may be quickly and firmly clamped in place and may be easily and accurately replaced for repeated use requiring only a minimum of adjustment.

The brake pedal of an automobile, when not depressed, assumes a fixed outward position. Similarly, the accelerator pedal, for slow idling is at a fixed outward position. To make the engine idle at a higher speed for warming up the automobile, the accelerator will need to be held partly depressed during the warm-up period since, when cold, the engine will stall at its slowest idle speed.

It is a further object, therefore, to provide a suitable and accurate device for holding the accelerator pedal of an automobile partly depressed so that the engine will run at a speed higher than its slowest idle speed while unattended, in order to warm up the engine, or in some cases to provide a high enough engine speed to charge the battery of the automobile while the automobile is parked. Such elevated speed for battery charging may be desired, for instance, when on a picnic or other outing and the automobile headlights are used for illumination.

It is also an object of the present invention to provide a device of this type that is adapted for use on any make of automobile, and one that is readily stored in the automobile when not in use.

Other and further objects and advantages will appear from the following specification taken with the accompanying drawings in which like character references refer to the same or similar elements in the several views and in which.

Figure 1:
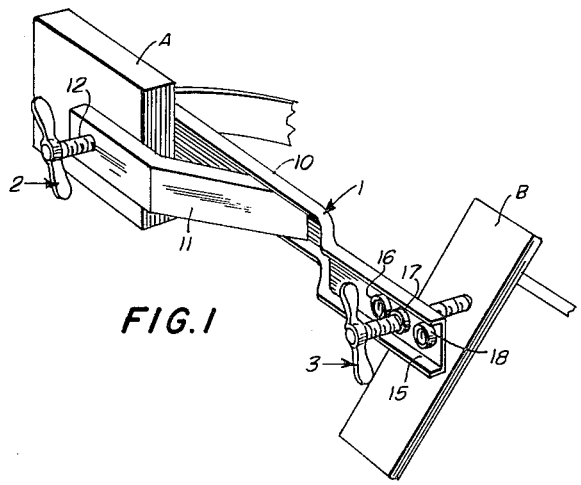
FIGURE 1 is a perspective view of a brake pedal and accelerator with the device in place.

The device comprises broadly a frame element 1, an attaching means 2 to attach the device to the brake pedal A of an automobile, and an adjustable throttle hold down element 3, to engage throttle pedal B.

Specifically, the frame element 1 is made preferably of a channel-shaped heavy gage bar 10 having an offset leg 11 welded to it to form a bifurcated end to engage over the brake pedal of an automobile. Securing means 2 is shown as a wing headed bolt 12. Other means, such as an over dead-center cam means may be used in lieu of threaded element 12. Adjustable throttle hold-down element 3 is shown as a threaded wing bolt 13.

Frame element 1 may be, and preferably is, made of stamped channel material as seen specifically in the figures of drawing, but may be formed of heavy gage plate in lieu of the lighter channel material.

Figure 2:
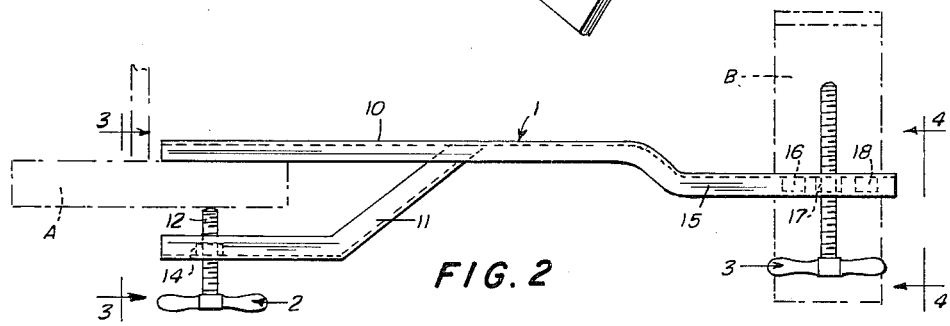
FIGURE 2 is a plan view of the device.
Figure 3:
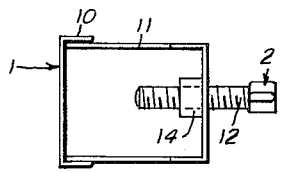
FIGURE 3 is an end view on line 3—3 of FIGURE 2, showing an edge view of the device mounted in place for use.
Figure 4:
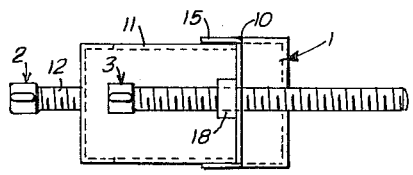
FIGURE 4 is an end view on line 4—4 of FIGURE 2.

Wing bolt 12 threadedly engages the leg 11 by means of a nut element 14 that is welded to leg 11 and gives sufficient length of screw thread to provide ample bearing for the bolt. Where the element 11 is of sufficiently heavy gage the nut element 14 may be omitted. As seen in FIGURES 1 and 2, the device may be readily applied to and removed from the brake pedal of an automobile with the arm portion 15 extending to the right to overlie the throttle pedal of the auto. Arm 15, as seen in FIGURES 1 and 2, is provided with a plurality of nut elements 16, 17, 18 having threaded openings to provide a choice of positions for the adjustable throttle hold-down bolt 13 to accommodate different makes of automobile. Bolt 13 is shown as mounted in element 17.

Frame element 1, between the point of attachment of leg 11 and arm portion 15, may be twisted clockwise in FIGURE 1, if desired, so that the axis of hold-down element 13 will be more nearly normal to the surface of the throttle or accelerator pedal B.

It will be understood then, that when it is desired to warm up an automobile in cold weather, or to charge the battery of the automobile, it is not desired that the operator stay in the automobile. The device, according to the present invention, is therefore clasped to the brake pedal of the automobile by means of clasping device 12 and the element 13 is adjusted to provide an engine speed suitable for warm up, or for battery charging. The device is useful too in automobile repair shops where, in testing automobiles, it is desired to have the motor run at a selected speed.

When the operator returns to the automobile after the warmup, it is only necessary to release element 12, and the device may be removed and placed in, say, the glove compartment of the automobile, and reapplied whenever necessary. It will be appreciated that the adjustment of the throttle adjusting element 13 need not be disturbed upon removal of the device, so it will not need to be readjusted when the device is remounted for use.

Having thus described my invention, what I claim as new, and desire to secure by Letters Patent is:

A fast idling attachment for an automobile comprising a rigid unitary flat frame element having two flat legs at one end thereof; screw clamp means in one of said legs, said screw clamp means extending inwardly toward the other said leg whereby the attachment may be secured to the brake pedal of the automobile; the other end of said flat frame element being laterally offset from said legs; a threaded aperture in said offset end; a screw threaded element in said threaded aperture and extending parallel to and operative in the same direction as said screw clamp means whereby said screw threaded element may depress the accelerator pedal of the automobile when said attachment is clamped to the brake pedal of the automobile; a plurality of additional longitudinally spaced screw threaded apertures in said offset end, whereby the screw threaded element may be selectively positioned in said offset end to provide for differences in the distance between the brake and accelerator pedals.

References Cited by the Examiner
UNITED STATES PATENTS

| | | | |
|---|---|---|---|
| 2,540,672 | 2/1951 | Holmes | 248—226 X |
| 3,075,402 | 1/1963 | Sellars | 74—532 |
| 3,127,787 | 4/1964 | Fagan | 74—532 |
| 3,165,942 | 1/1965 | Steiner et al. | 74—493 |

MILTON KAUFMAN, *Primary Examiner.*

BROUGHTON G. DRUHAM, *Examiner.*